(12) United States Patent
Seibold et al.

(10) Patent No.: US 10,552,737 B2
(45) Date of Patent: Feb. 4, 2020

(54) ARTIFICIAL NEURAL NETWORK CLASS-BASED PRUNING

(71) Applicant: AXIS AB, Lund (SE)

(72) Inventors: Robin Seibold, Lund (SE); Jiandan Chen, Lund (SE); Hanna Björgvinsdóttir, Lund (SE); Martin Ljungqvist, Lund (SE)

(73) Assignee: Axis AB, Lund (SE)

( * ) Notice: Subject to any disclaimer, the term of this patent is extended or adjusted under 35 U.S.C. 154(b) by 23 days.

(21) Appl. No.: 15/851,173

(22) Filed: Dec. 21, 2017

(65) Prior Publication Data

US 2018/0181867 A1 Jun. 28, 2018

(30) Foreign Application Priority Data

Dec. 21, 2016 (EP) .................................... 16205831

(51) Int. Cl.
*G06N 3/08* (2006.01)
*G06K 9/62* (2006.01)

(52) U.S. Cl.
CPC ........... *G06N 3/082* (2013.01); *G06K 9/6253* (2013.01); *G06K 9/6262* (2013.01)

(58) Field of Classification Search
CPC ..... G06N 3/082; G06K 9/6253; G06K 9/6262
See application file for complete search history.

(56) References Cited

U.S. PATENT DOCUMENTS

| 5,787,408 A | 7/1998 | Deangelis | |
| 2014/0180986 A1* | 6/2014 | Hinton | G06N 3/0454 706/21 |
| 2016/0307098 A1* | 10/2016 | Goel | G06N 3/082 |
| 2018/0114114 A1* | 4/2018 | Molchanov | G06N 3/082 |

OTHER PUBLICATIONS

"Transferring and Compressing Convolutional Neural Networks for Face Representations", Grundstrom et al., Jul. 1, 2016, Network and Parallel Computing: Lecture Notices in Computer Science; Lec. Notes Computer; Springer International Publishing, CHAM, pp. 20-29, XP047348101.
"Pruning Algorithms—A Survey", IEEE Transactions on Neural Networks, IEEE Service Center, Piscataway, NJ, US, vol. 4, No. 5, Sep. 1, 1993, pp. 740-747, XP000423520.

(Continued)

*Primary Examiner* — Vincent Gonzales
*Assistant Examiner* — Kevin W Figueroa
(74) *Attorney, Agent, or Firm* — Volpe and Koenig, P.C.

(57) ABSTRACT

Methods and apparatus, including computer program products, implementing and using techniques for configuring an artificial neural network to a particular surveillance situation. A number of object classes characteristic for the surveillance situation are selected. The object classes form a subset of the total number of object classes for which the artificial neural network is trained. A database is accessed that includes activation frequency values for the neurons within the artificial neural network. The activation frequency values are a function of the object class. Those neurons having activation frequency values lower than a threshold value for the subset of selected object classes are removed from the artificial neural network.

7 Claims, 3 Drawing Sheets

(56) References Cited

OTHER PUBLICATIONS

"Face Recognition Based on Embedded Systems", Bjorgvinsdollir et al., In Master's Theses in Mathematical Sciences FMA820 20161 Mathematics (Faculty of Technology) and Numerical Analysis, Aug. 25, 2016, pp. 1-31, XP055378048.
"Web-Scale Training for Face Identification", Taigman et al., 2015 IEEE Conference on Computer Vision and Pattern Recognition (CVPR), IEEE, Jun. 7, 2015, pp. 2746-2754, XP032793721.
"A Deep Neural Network Compression Pipeline: Pruning, Quantization, Huffman Encoding", Han et al., Oct. 1, 2015, pp. 1-11, XP055378073.
EP 16 20 5831.7 European Search Report (dated Jun. 13, 2017).

\* cited by examiner

ARTIFICIAL NEURAL NETWORK CLASS-BASED PRUNING

BACKGROUND

The present teaching relate to artificial neural networks, and more particularly to artificial neural networks used for object recognition and verification. In recent years, improvements to such artificial neural networks have largely been due to network expansions and an increase in training data. However, complex artificial neural network architectures often contain tens or hundreds of millions of parameters. While such artificial neural networks produce good accuracy, the large amount of parameters can make deployment infeasible, especially on embedded systems that often have limited computing power. As a result of the increasing size of artificial neural networks, there is an increased interest for compressing artificial neural networks in order to maintain the improvements, while at the same time making them feasible to implement in systems having limited computing power.

Since artificial neural networks are typically very large, as mentioned above, they can often be "over-parameterized." This makes it possible to remove parameters, such as weights and biases, or entire neurons, without significantly impacting the performance of the artificial neural network. This procedure is typically referred to as "pruning" the artificial neural network. When a neuron is removed, it is possible to back-trace the calculations for that neuron. It can then be seen that all weights leading to that neuron can be removed safely. It is also possible to track neuron output and remove weights going from that neuron. However, identifying which neurons to remove in the pruning process and implementing the pruning process in such a way that performance can be gained is not trivial.

Pruning can be applied to layers containing trainable parameters, traditionally fully connected layers and convolutional layers. This helps to simplify and speed up the calculations. For example, removing a neuron from a fully connected layer is equivalent to skipping a dot product between a matrix row and a vector. As a result, the matrix becomes smaller. Removing a neuron from a convolutional layer means skipping the dot product between one matrix row and one matrix column, which is the same as skipping one convolution. The removal of neurons will be discussed in further detail in the Detailed Specification below. Determining which neurons can be removed without heavily affecting the accuracy of the artificial neural network can be done by analyzing the neurons during the training/test phase, and from the resulting data identifying which neurons are "dead," that is, which neurons seldom or never produce non-zero output. Deciding how many times a neuron must produce non-zero output to not be defined as dead can be done by comparing the performance using different thresholds, and after the neurons have been removed a re-training can be done in order to improve the performance. This can be done iteratively.

Another approach for pruning focuses on removing weights, either using a threshold or using regularization with norms to force some weights to zero already during the training step. Regularization is a mathematical/statistical method, well known to those having ordinary skill in the art, that is used to enforce conditions, for example sparsity (forcing some values to zero) or smoothness. For further details on regularization for pruning, see the paper: "Memory bounded deep convolutional networks" arXiv CoRR 2014—Section 3: Regularization Updates available online at https://arxiv.org/abs/1412.1442.

By sufficiently pruning an artificial neural network in these manners, with an implementation that can avoid calculations for the removed parameters, the computations for executing the artificial neural network are lower than for a full network.

SUMMARY

The present teachings wholly or partly eliminate the above problems by a method, a computer program product, and a storage medium as recited in the present claims.

According to a first aspect, the method, in a computer system, configures an artificial neural network to a particular surveillance situation. The method is characterized by the steps of:
  electing a number of object classes characteristic for the surveillance situation, wherein the object classes form a subset of the total number of object classes for which the artificial neural network is trained;
  accessing a database including activation frequency values for neurons within the artificial neural network wherein the activation frequency values are a function of the object class; and
  removing from the artificial neural network those neurons having activation frequency values lower than a threshold value for the subset of selected object classes.

This provides a way of creating an artificial neural network that is lightweight and therefore suitable for embedded devices, such as cameras or mobile devices. In particular, by knowing that only a few classes (i.e., a subset of all possible classes) may be expected and pruning the artificial neural network to those classes based on the frequency of neuron usage, it is possible to adapt a large artificial neural network to different preconditions as needed and without having to retrain the artificial neural network, as is conventionally done. Retraining an artificial neural network typically both requires a significant amount of time, and new data for retraining, while pruning the artificial neural network to a certain set of classes is a much faster operation. Further, this method can be used in combination with other conventional methods (e.g., using thresholding or regularizing weights to zero) to possibly remove an even larger number of neurons and even further lower the computational performance for deploying artificial neural networks in embedded devices.

According to one embodiment the threshold value is a static value determined for each class during a training procedure for the artificial neural network. By allowing different threshold values for different relevant classes, it is possible to improve the accuracy of the system compared to if the same threshold value was used across the board for every relevant class.

According to one embodiment, the threshold value is adaptive for each class based on system performance. By having an adaptive threshold value that is based on system performance, the system can be further enhanced based on data obtained from an actual surveillance situation in which the system is deployed.

According to one embodiment, the selection of object classes characteristic for the surveillance situation can be refined based on data collected over a certain time period, and the selecting, accessing and removing steps can be repeated for the refined selection of object classes. This allows further refinement and fine-tuning of the system, based on real observation data and evaluation of system performance.

According to one embodiment, at least some of the selecting, accessing, and removing steps are performed in response to a user input received through a user interface. Having a user interface allows the user to decide to what degree the pruning should be automated, vs. based on input from the user. For example, the user may decide to add or delete relevant classes, change threshold values for individual classes, etc., in order to further improve the functioning of the pruned artificial neural network.

According to one embodiment, removing neurons in a fully connected artificial neural network corresponds to removing rows and columns from matrices forming mathematical representations of individual layers of the artificial neural network. By removing entire neurons, as opposed to only removing weights, the number of computations needed in calculating the output from the artificial neural network can be significantly reduced.

According to one embodiment, removing neurons from the artificial neural network includes removing a sufficient number of neurons such that a reduction in computational resources needed for calculating the output from the artificial neural network outweighs an increase in computational resources needed for maintaining records about the removed neurons. That is, a break-even point can be found where the pruning of the artificial neural network is such that the required computational resources are much lower compared to the un-pruned network, thus making it suitable for deployment in embedded devices, while at the same time the performance of the artificial neural network remains high.

According to one embodiment, the artificial neural network is deployed in an embedded device. The embedded device may be, for example, a surveillance camera or a cellular phone. By being able to use artificial neural networks in embedded devices of this type, the operation of the embedded devices can be significantly enhanced.

According to a second aspect, a computer program configures an artificial neural network to a particular surveillance situation. The computer program contains instructions corresponding to the steps of:
  selecting a number of object classes characteristic for the surveillance situation, wherein the object classes form a subset of the total number of object classes for which the artificial neural network is trained;
  accessing a database including activation frequency values for the neurons within the artificial neural network wherein the activation frequency values are a function of the object class; and
  removing from the artificial neural network those neurons having activation frequency values lower than a threshold value for the subset of selected object classes.

According to a third aspect, the computer program is stored in a digital storage medium. The computer program and the storage medium involve advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

FIG. 3 shows an equation 300 for full calculations of the neural network of FIG. 2 prior to pruning, in accordance with one embodiment.

FIG. 4 shows an equation 400 for calculations of the neural network of FIG. 2 after pruning, in accordance with one embodiment.

Like reference symbols in the various drawings indicate like elements.

DETAILED DESCRIPTION

Figure 1:
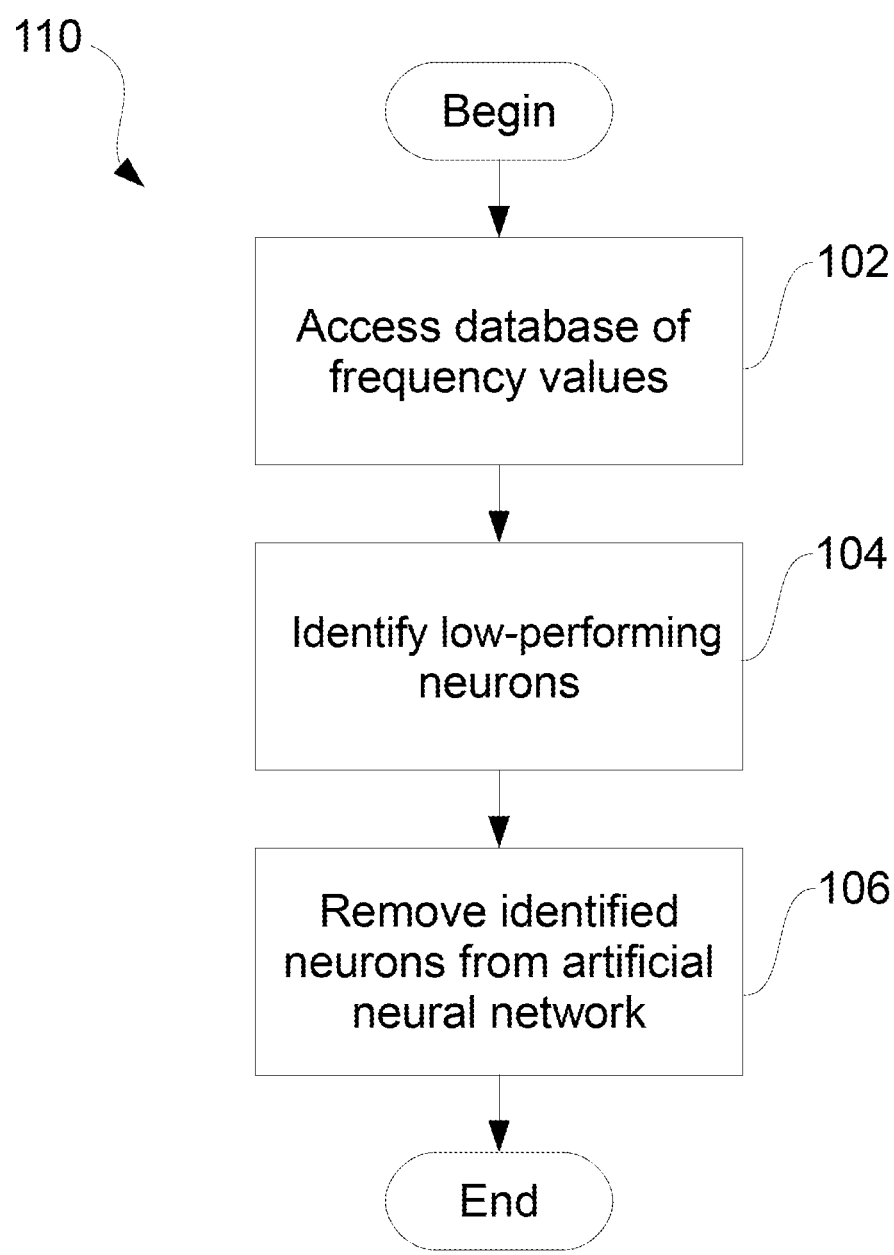
FIG. 1 shows a flowchart of a process 100 for pruning an artificial neural network, in accordance with one embodiment.

As was discussed above, it is preferable to prune an artificial neural network, in order for the artificial neural network to be usable in embedded devices, such as cameras and mobile devices. The various embodiments described herein accomplish this by pruning weights separately for each class of objects, based on the use frequency of neurons for images of a particular class. This can be done in ways that are similar to conventional techniques, e.g., by analyzing the neurons of the artificial neural network during the test phase, and from the results of such an analysis identifying which neurons are used less frequently. However, in accordance with the embodiments described herein, only images belonging to a certain class are fed through the artificial neural network, and the low-performing neurons are identified.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present teachings may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Artificial Neural Network Pruning

The techniques in accordance with various embodiments will now be described by way of example and with reference to FIGS. 1-4. In this example, it is assumed that there exists an artificial neural network, for which training has been performed for 1000 classes. However, in a situation where images are recorded by a surveillance camera, for example, a user may only be interested in 12 of the 1000 classes.

FIG. 1 is a flowchart showing a process 100 for pruning an artificial neural network in accordance with one embodiment. As can be seen in FIG. 1, in order to figure out what neurons are low-performing for these classes, a database is accessed in step 102. The database contains activation frequency values for the neurons within the artificial neural network, as a function of the object class.

Next, low-performing neurons that can safely be removed from the artificial neural network are identified in step 104. This can be done, for example, by studying activation frequency values for the neurons for each of the 12 classes and using a threshold value that defines what activation frequency value constitutes a low-performing neuron. The threshold value can be predetermined according to different classes during the training procedure of the artificial neural network, or can be adaptive during inference procedure according to prediction performance. That is, the threshold value can be adapted to the system performance.

Finally, in step 106, the low-performing neurons are removed from the artificial neural network, which ends the process 100 and results in an "adaptive artificial neural network" that is capable of adjusting its architecture in accordance with a user's need.

In some embodiments, this process may require certain input from a user through a user interface (UI), and the process may be repeated as desired. For example, in one embodiment, there may be a time period of full evaluation (e.g., one week) of a particular surveillance situation, which is followed by selecting and pruning the classes that have been identified during that time period.

Various degrees of automation can be used to aid the user in selecting classes. For example, in some embodiments, the selection of classes can be fully automated. In other embodiments, a user can be presented with a subset of classes that are automatically selected, and from which a manual user selection can be made. In yet other embodiments, the user may select freely among all the classes. Some embodiments also allow a user to make additions to a set of selected classes, if the user determines that such an addition would be beneficial for the specific situation at hand. Many variations can be envisioned by those having ordinary skill in the art, based on the specific situations.

Figure 2:
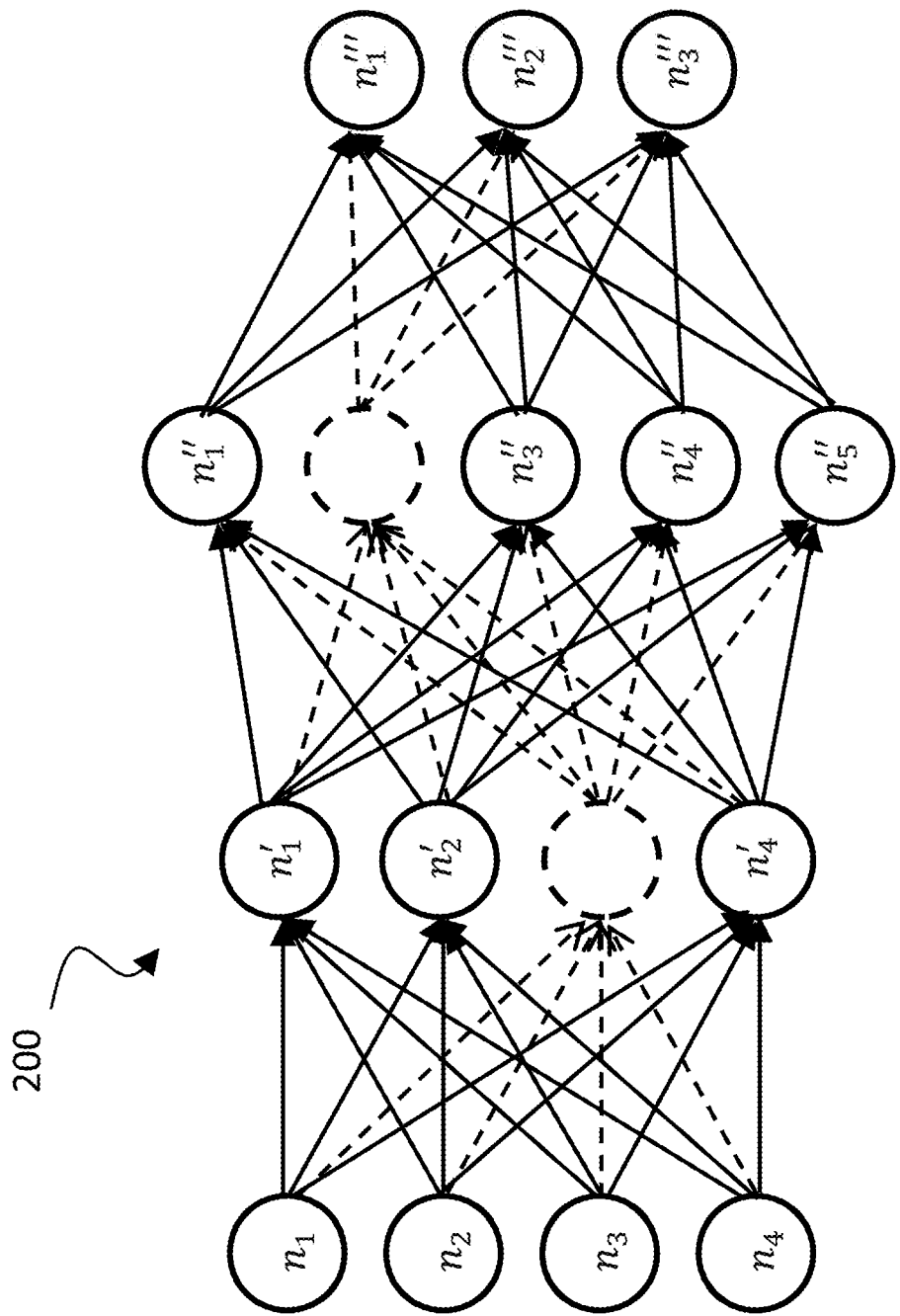
FIG. 2 shows a schematic view of an artificial neural network 200, in accordance with one embodiment.
Figures 3, 4:
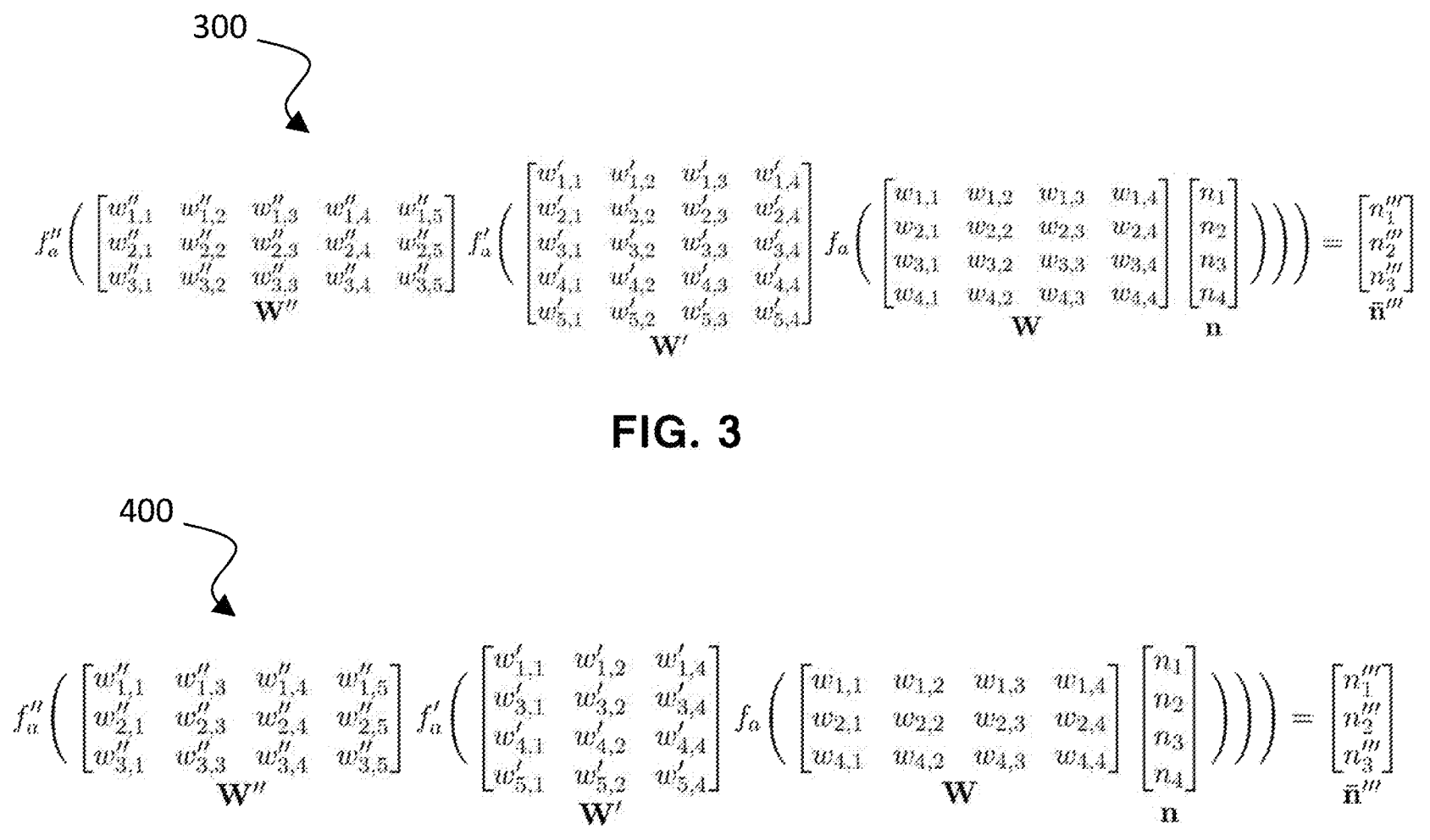

FIG. 2 shows a schematic illustration of a small artificial neural network 200, consisting of fully connected layers only, from which certain neurons (shown in dashed lines) have been removed, using the above techniques, to create an adaptive artificial neural network. FIG. 3 shows the full calculation 300 for the artificial neural network before the neurons are actually removed, and FIG. 4 shows the calculations 400 after removing the calculations that correspond to the removed neurons, that is, the calculations performed by the resulting adaptive artificial neural network.

As can be seen by comparing the equations in FIG. 3 and FIG. 4, respectively, the amount of calculations is significantly reduced after removing the low performing neurons. Typically, more neurons and weights can be pruned if the pruning is based on fewer classes (e.g., if the user were only interested in 6 classes instead of 12), since the variability in training data is reduced, thereby resulting in an even leaner artificial neural network.

Representing Sparse Matrices

The traditional way of pruning an artificial neural network is done by independently looking at weight values, and removing weights that are below a certain threshold. While this introduces sparsity in the layers, the sparsity is unstructured. If pruning instead is based on neurons, all weights contributing to a pruned neuron can be removed, resulting in a structured sparsity. In the case of an artificial neural network with fully connected layers, this means that entire rows and columns in the output calculations can be removed.

As the only operation needed with the weight matrices is multiplication, the rows and columns corresponding to the pruned neurons can be removed without affecting the result. Using this technique, the matrices are reduced in size, as is also common in conventional pruning methods, but the indices used to represent the sparse matrices are not stored for each matrix, but for the resulting matrix only in order to reconstruct the final full-size output. This may also result in further benefits. For example, the resulting sparse matrix may have a structure that requires less computational power to handle "bookkeeping," as will be described in further detail below.

As long as there are a fair number of pruned neurons, the resulting sparse matrix multiplication is faster than full matrix multiplication. It needs more bookkeeping (i.e., keeping track of indices of where the pruned neurons are located), but requires fewer multiplications. It also saves storage and memory space compared to conventional methods, and might facilitate vector operations, such as single instruction multiple data (SIMD), which is typically not possible on sparse matrices, and which would make the operations faster. Exactly what constitutes a "fair number" of pruned neurons will vary from case to case, but in every case, there will be a break-even point where the gain in fewer calculations will outweigh the loss in maintaining the records.

Furthermore, a sparse matrix may be expressed in many different ways, mathematically, and it is probable that by using the right expression for the particular structure may further reduce the threshold for reaching this break-even point.

Lastly, as the skilled person realizes, when entire rows and columns of matrices are removed from the calculations shown herein, the dimensions of the resulting sparse matrix will change. Consequently, if the last layer of the neural network is pruned, it is necessary to update a class label file in order to be able to associate a particular output with a particular class. Another alternative is to not prune the last layer, in which case the original class label file can be used as is.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope and spirit of the teachings. For example, the methods described herein can be performed not only as standalone methods, but can also be combined with other known methods to enhance pruning of the artificial neural network. The embodiment was chosen and described in order to best explain the principles and the practical application, and to enable others of ordinary skill in the art to understand the various embodiments with various modifications as are suited to the particular use contemplated.

What is claimed is:

1. A method for configuring an artificial neural network in an embedded device to a particular surveillance situation, the method comprising:
    selecting a number of object classes characteristic for the surveillance situation, wherein the object classes form a subset of the total number of object classes for which the artificial neural network is trained;
    accessing a database including activation frequency values for the neurons within the artificial neural network, wherein the activation frequency values include at least one activation frequency value for each object class; and
    removing from the artificial neural network those neurons having activation frequency values lower than a threshold activation frequency value for the subset of selected object classes, wherein the removed number of neurons is such that a reduction in computational resources needed for calculating the output from the artificial neural network outweighs an increase in computational resources needed for maintaining records about the removed neurons.

2. The method of claim 1, wherein the threshold activation frequency value is a static value determined for each class during a training/test procedure for the artificial neural network.

3. The method of claim 1, wherein the threshold activation frequency value is adaptive for each class based on artificial neural network performance.

4. The method of claim 1, further comprising:
    refining the selection of object classes characteristic for the surveillance situation, based on data collected over a certain time period; and
    repeating the selecting, accessing and removing steps for the refined selection of object classes.

5. The method of claim 1, wherein at least some of the selecting, accessing, and removing steps are performed in response to a user input received through a user interface.

6. The method of claim 1, wherein, in a fully connected artificial neural network, removing neurons corresponds to removing rows and columns from matrices forming mathematical representations of individual layers of the artificial neural network, thereby reducing the number of computations needed in calculating the output from the artificial neural network.

7. A non-transitory computer-readable storage medium including instructions which, when executed in a processing system, cause the system to execute a method for configuring an artificial neural network employed in an embedded device to a particular surveillance situation, the method comprising:
- selecting a number of object classes characteristic for the surveillance situation, wherein the object classes form a subset of the total number of object classes for which the artificial neural network is trained;
- accessing a database including activation frequency values for the neurons within the artificial neural network, wherein the activation frequency values include at least one activation frequency value for each object class; and
- removing from the artificial neural network those neurons having activation frequency values lower than a threshold activation frequency value for the subset of selected object classes, wherein the removed number of neurons is such that a reduction in computational resources needed for calculating the output from the artificial neural network outweighs an increase in computational resources needed for maintaining records about the removed neurons.

* * * * *